United States Patent [19]
Milner et al.

[11] Patent Number: 5,720,880
[45] Date of Patent: Feb. 24, 1998

[54] SUGAR CENTRIFUGAL SCREEN SAVER

[75] Inventors: Ted D. Milner, Westminster; Verne A. Hubalek, Aurora, both of Colo.

[73] Assignee: California Pellet Mill Company, Nashua, N.H.

[21] Appl. No.: 669,682

[22] Filed: Jun. 24, 1996

Related U.S. Application Data

[60] Provisional application No. 60/000,809, Jul. 3, 1995.
[51] Int. Cl.[6] ............................................. B01D 21/26
[52] U.S. Cl. .......................... 210/377; 210/380.1; 494/36
[58] Field of Search .............................. 210/360.1, 380.1, 210/377; 494/36

[56] References Cited

U.S. PATENT DOCUMENTS 2,883,054  4/1959  Sanchez.
3,955,754  5/1976  Schaper.
4,017,022  4/1977  Fiedler.
4,072,266  2/1978  Dietzel.
4,802,925  2/1989  Schaper et al..

FOREIGN PATENT DOCUMENTS 1225508   7/1960   France.
1158906   12/1963  Germany.
2008182   9/1971   Germany.
2114776   9/1972   Germany.

*Primary Examiner*—David A. Reifsnyder
*Attorney, Agent, or Firm*—Nixon & Vanderhye

[57] ABSTRACT

In a continuous sugar centrifugal, an imperforate thin, open ended, truncated cone, of high strength corrosion-resistant material is placed on the working screen within the centrifugal basket. The cone extends part way up the working screen and protects the working screen from damage from high impact particles being released from an accelerator bell.

11 Claims, 4 Drawing Sheets

5,720,880

SUGAR CENTRIFUGAL SCREEN SAVER

This Application claims the benefit under Title 35, U.S.C. §119 (e) of U.S Provisional application serial no. 60/600,809 filed Jul. 3, 1995.

BACKGROUND OF THE INVENTION

This invention relates generally to continuous sugar centrifugals and more particularly to a means for reducing damage to a centrifugal screen.

In a sugar centrifugal, massecuite is fed onto the filter screen. The massecuite can include foreign materials such as rust scale, tramp iron, nuts, bolts, etc. These materials are very dense and heavy. As this material enters the basket area of the centrifugal, it is quickly accelerated and is thrown against the screen. The damage is caused by the high impact of the massecuite and foreign materials as they are thrown a distance to impinge on the screen surface. The damage causes holes, tears and cuts near the top of the screen clamp ring. The further the distance the material is thrown, the greater the damage. These small pieces will rapidly wear the screens and form small holes around the bottom of the centrifugal filter screens. Over a short period of time the foreign material can cut the screen off very near to the screen clamp, and any holes at the bottom of the filter screen will result in a decreased useful life of the filter screens, causing sugar crystals to be lost through these holes.

The foregoing illustrates limitations known to exist in present sugar centrifugals. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing in a continuously operating centrifugal for separating solids from a fluid mixture, the centrifugal having a frusto-conical basket having a substantially vertical axis with its greater diameter end at the upper end thereof, and a feed means for discharging the solids containing fluid mixture proximate the basket lower end, a screen structure comprising: a frusto-conical backing screen coaxially mounted within the basket; a frusto-conical working screen coaxially mounted with the basket; and an imperforate frusto-conical screen saver mounted within the basket, the screen saver extending upwardly along the working screen a pre-determined distance from the lower end of the working screen; the backing screen being between the working screen and the basket, and the working screen being between the screen saver and the backing screen.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
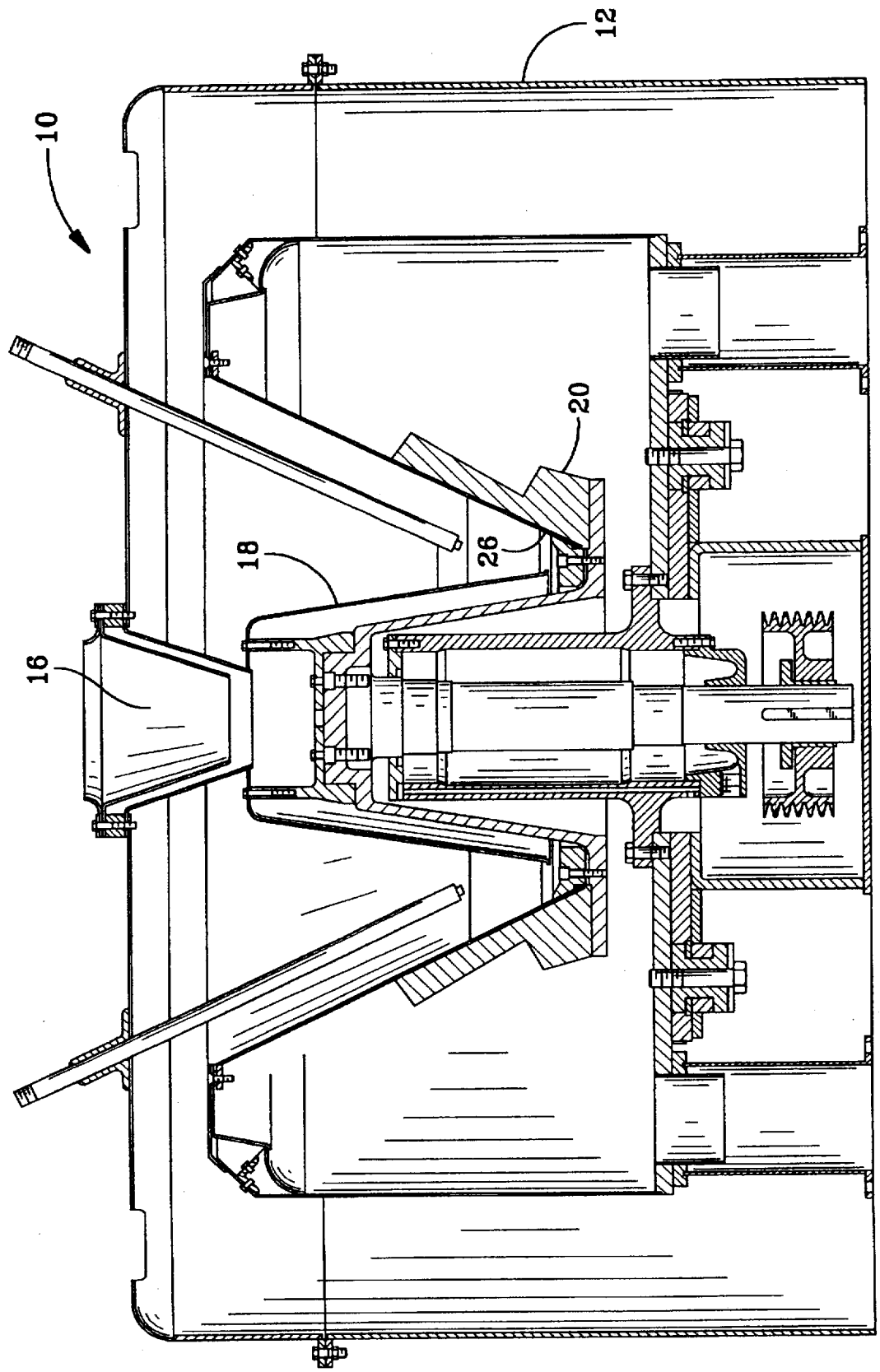
FIG. 1 is a cross-sectional view of a rotating basket, sugar separating centrifugal, incorporating an embodiment of the present invention.
Figure 2:
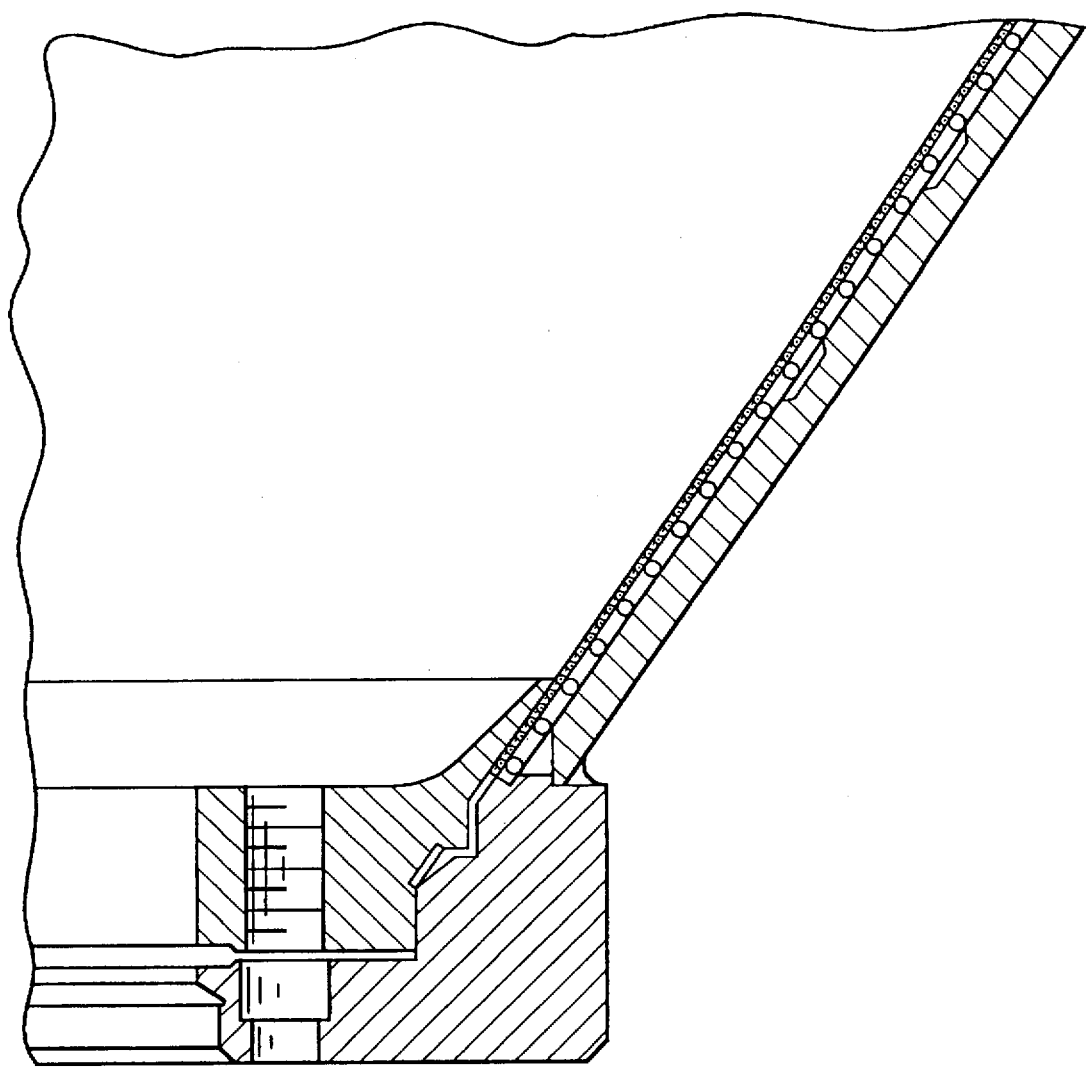
FIG. 2 is an enlarged cross-sectional view of a portion of a prior art rotating basket.
Figure 3:
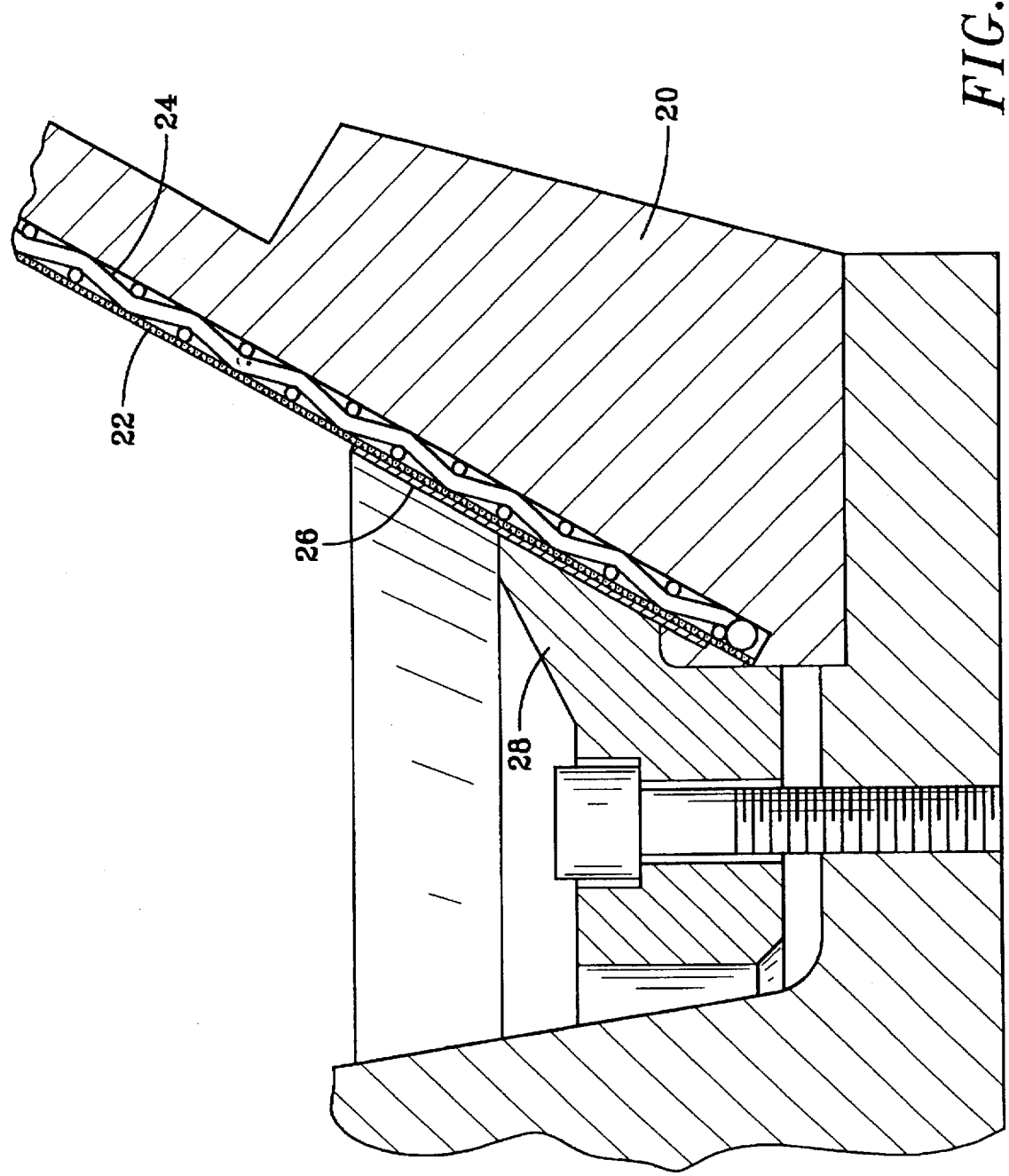
FIG. 3 is an enlarged cross-sectional view of a portion of a rotating basket illustrating a first embodiment of the present invention.

As shown in FIG. 1, a rotating basket, sugar separating centrifugal 10 comprises a housing 12 having an upper portion with a central opening in which a massecuite (molasses and sugar crystal fluid mixture) admitting cone 16 is fixed. The cone 16 opens into an accelerator bell 18. Coupled to and positioned about the accelerator bell 18 is a rotating basket 20. The centrifugal 10 operates in the usual, well known manner to separate sugar crystals from molasses. The molasses passes through a working screen 22 positioned on a backing screen 24 (see FIGS. 2 through 4) carried by the basket 20 and the sugar crystals travel up the working screen 22 to the top of the basket 20. The working screen 22 and the backing screen 24 are clamped to the basket 20 by a screen clamp 28.

A thin imperforate stainless steel, open ended, truncated cone screen saver 26 is placed under the screen clamp 28 and extends part way up the lower portion of the working screen 22 to a point above the release level of the accelerator bell 18. Preferably, the screen saver 26 extends 30 mm to 50 mm above the upper edge of the screen clamp. This screen saver 26 absorbs the impact of any large particles or tramp material in the massecuite as the massecuite leaves the accelerator bell 18 and is thrown towards the screens. The small distance the massecuite is thrown from the surface of the screen saver 26 onto the working screen 22 will lessen the impact on the working screen, which will reduce damage and wear to the working screen surface 22. Another benefit from the screen saver 26 is the feed onto the working screen 22 will be more uniform and a straighter sugar transition zone on the basket 20 will be obtained. This will result in high quality sugar and better molasses from the continuous centrifugal 10.

Preferably, the thickness of the screen saver 26 is between 0.03 inches and 0.048 inches. The upper edge of the screen saver 26 can be rounded or tapered to further reduce the distance from the surface of the screen saver 26 to the working screen 22. The screen saver 26 can be formed from a flat arc shaped piece which is then welded together at the ends to form a cone. Preferably, the screen saver 26 is a spun cone formed from a flat sheet. Also, preferably, the screen saver 26 is a solid cone. If segmented cone shaped pieces were used to form the screen saver 26, the centrifugal force would force the pieces to slip out from under the screen clamp 28.

Figure 4:
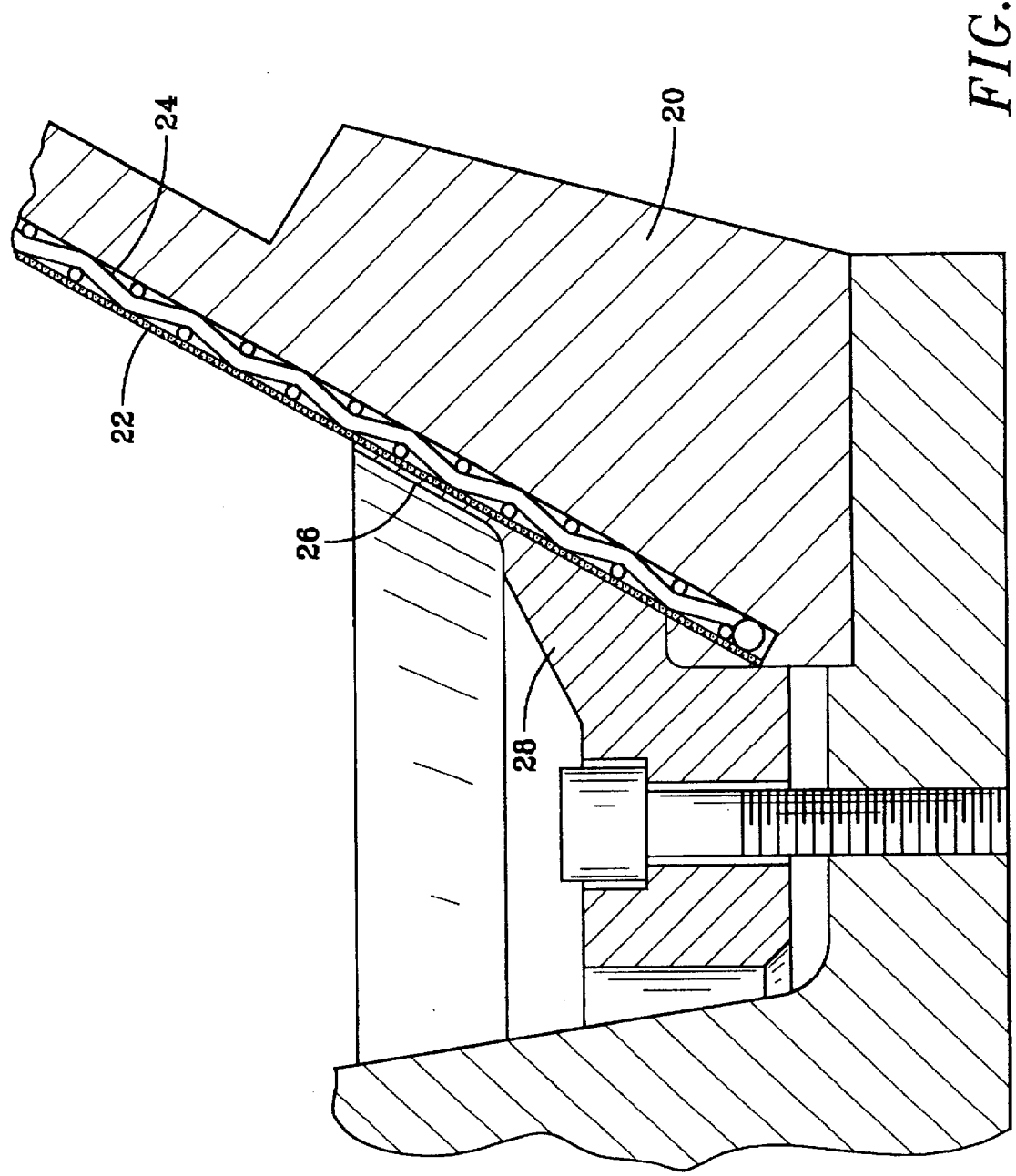
FIG. 4 is an enlarged cross-sectional view of a portion of a rotating basket illustrating a second embodiment of the present invention.

An alternate embodiment of the screen saver 26' is shown in FIG. 4. In this embodiment, the screen saver and the screen clamp are formed as a single monolithic piece 26'.

Having described the invention, what is claimed is:

1. In a continuously operating centrifugal for separating solids from a fluid mixture, the centrifugal having a frusto-conical basket having a substantially vertical axis with its greater diameter end at the upper end thereof, and a feed means for discharging the solids containing fluid mixture proximate the basket lower end, a screen structure comprising:

a frusto-conical backing screen coaxially mounted within the basket;

a frusto-conical working screen coaxially mounted with the basket; and an imperforate frusto-conical screen saver mounted within the basket, the screen saver extending upwardly along the working screen a pre-determined distance from the lower end of the working screen;

the backing screen being between the working screen and the basket, and the working screen being between the screen saver and the backing screen.

2. The screen structure according to claim 1, further comprising:

a means for clamping the screen saver, the working screen, and the backing screen to the basket.

3. The screen structure according to claim 2, wherein the predetermined distance is 30 mm to 50 mm above an upper edge of the means for clamping.

4. The screen structure according to claim 1, further comprising:

a means for clamping the working screen and the backing screen to the basket, the screen saver being monolithic with the means for clamping.

5. The screen structure according to claim 1, wherein the screen saver has a thickness of between about 0.03 inches and about 0.048 inches.

6. The screen structure according to claim 1, wherein the screen saver has a thickness of about 0.048 inches.

7. The screen structure according to claim 1, wherein the screen saver extends upwardly along the working screen to a point higher than the point at which the feed means discharges the solid containing fluid.

8. The screen structure according to claim 1, wherein the upper end of the screen saver is a rounded edge.

9. The screen structure according to claim 1, wherein the upper end of the screen saver is tapered.

10. In a continuously operating centrifugal for separating solids from a fluid mixture, the centrifugal having a frusto-conical basket having a substantially vertical axis with its greater diameter end at an upper end thereof, and a feed means for discharging the solids containing fluid mixture proximate a lower end of the basket and including an accelerator bell having a mixture outlet proximate said basket lower end, a screen structure comprising:

a frusto-conical working screen coaxially mounted with the basket; and an imperforate frusto-conical screen saver mounted within the basket, the screen saver extending upwardly along the working screen a pre-determined distance from the lower end of the working screen, said screen saver extending from below the mixture outlet of said accelerator bell upwardly above said outlet end and terminating short of the upper end of said basket;

the working screen being between the screen saver and the basket.

11. A screen structure according to claim 10 including a frusto-conical backing screen coaxially mounted within the basket between said working screen and said basket.

\* \* \* \* \*